United States Patent [19]

Hayashi

[11] Patent Number: 5,773,965
[45] Date of Patent: Jun. 30, 1998

[54] SWITCHING POWER SUPPLY APPARATUS FOR CONVERTING A HIGH DC VOLTAGE INTO A LOW DC VOLTAGE

[75] Inventor: Hiroshi Hayashi, Kyoto, Japan

[73] Assignee: Rohm Co., Ltd., Kyoto, Japan

[21] Appl. No.: 736,072

[22] Filed: Oct. 23, 1996

[30] Foreign Application Priority Data

Oct. 24, 1995 [JP] Japan ................................. 7-275971

[51] Int. Cl.[6] ............................. G05F 1/10; G05F 1/40
[52] U.S. Cl. .......................... 323/222; 323/274; 323/284
[58] Field of Search .................................. 323/282, 284, 323/285, 222, 274, 246, 275

[56] References Cited

U.S. PATENT DOCUMENTS

| 4,760,324 | 7/1988 | Underhill | 323/282 |
|---|---|---|---|
| 4,829,259 | 5/1989 | Konopka | 323/289 |
| 4,862,013 | 8/1989 | Konopka | 323/289 |
| 4,885,522 | 12/1989 | Konopka | 323/289 |
| 4,893,228 | 1/1990 | Orrick et al. | 323/282 |
| 5,105,144 | 4/1992 | Trump | 323/283 |
| 5,280,233 | 1/1994 | Poletto et al. | 323/280 |
| 5,422,562 | 6/1995 | Mammano et al. | 323/284 |
| 5,469,046 | 11/1995 | Wong et al. | 323/286 |
| 5,510,697 | 4/1996 | Dormer | 323/282 |
| 5,574,357 | 11/1996 | Otake et al. | 323/222 |

FOREIGN PATENT DOCUMENTS

| 0 095 724 A2 | 12/1983 | European Pat. Off. | H02M 3/155 |
|---|---|---|---|
| 0 196 679 A2 | 10/1986 | European Pat. Off. | H02M 3/155 |
| 1172544 | 12/1969 | United Kingdom | G05F 1/46 |

*Primary Examiner*—Peter S. Wong
*Assistant Examiner*—Bao Q. Vu
*Attorney, Agent, or Firm*—Nikaido, Marmelstein, Murray & Oram LLP

[57] ABSTRACT

A power supply circuit has a switching transistor and a inductance coil that are connected between an input terminal and an output terminal. A voltage across a capacitor that is connected between the output terminal and a ground potential node is extracted as an output voltage. Between the output terminal and the ground potential node, a Zener diode and a resistor are connected in series. When a voltage across the resistor exceeds a predetermined value, the switching transistor is put into a cut-off state by a drive circuit.

17 Claims, 7 Drawing Sheets

SWITCHING POWER SUPPLY APPARATUS FOR CONVERTING A HIGH DC VOLTAGE INTO A LOW DC VOLTAGE

BACKGROUND OF THE INVENTION

1. Field of the Invention

The present invention relates to a switching power supply apparatus, and especially to a switching power supply apparatus for converting a high DC voltage into a low DC voltage.

2. Description of the Prior Art

Switching power supply apparatus are employed as power supply units in various electronic appliances in order to convert a high DC voltage, such that is obtained by rectifying a commercially supplied AC power source, into a low DC voltage. Such power supply apparatus are also called DC—DC converters. Conventionally, in a power supply apparatus of this type, a switching transistor and an inductance coil are connected in series between the input and output terminals. Moreover, a capacitor is connected between the output terminal and the ground (reference potential node), and the voltage across that capacitor is extracted as an output voltage. Furthermore, a drive circuit is connected to the base of the switching transistor to turn the switching transistor on and off. Between the input terminal and the ground, a resistor and a Zener diode are connected in series in order to compare the output voltage at the output terminal with the Zener voltage. Accordingly, when the output voltage is higher than the Zener voltage, the switching transistor is turned off through the drive circuit. When the output voltage is lower than the Zener voltage, the switching transistor is turned on through the drive circuit. In this way, the switching transistor is turned on and off repeatedly, so that a nearly constant voltage is obtained at the output terminal.

The above described conventional circuit is defective in that it has rather low power-conversion efficiency. Specifically, the Zener diode requires a current of, for example, 5 mA to be kept constantly flowing as a Zener current. And, since the Zener diode is provided on the input side (high-voltage side), it dissipates considerably large power. For example, when the DC voltage at the input terminal is 141 V, it dissipates 5 mA×141 V. Thus, a conventional circuit is not at all efficient in power conversion.

SUMMARY OF THE INVENTION

An object of the present invention is to provide a switching power supply apparatus with improved voltage conversion efficiency.

To achieve the above object, according to the present invention, a power supply apparatus is provided with an input terminal; an output terminal; a switching means and an inductance means that are connected in series between the input terminal and the output terminal; a monitoring circuit connected between the output terminal and a reference potential node, for monitoring a voltage at the output terminal; a drive circuit for putting the switching means into either a conducting state or a non-conducting state according to a monitoring result of the monitoring circuit; and a path means for forming a path for a current resulting from a back electromotive force that is developed in the inductance means when the switching means is put into a non-conducting state.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
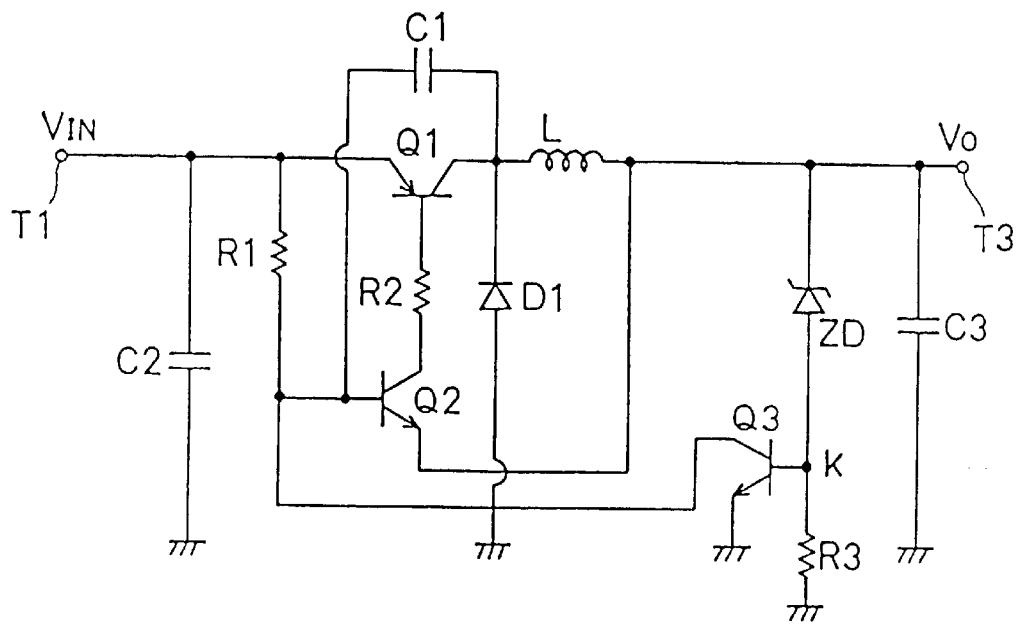
FIG. 1 is a circuit diagram showing the power supply apparatus of a first embodiment of the present invention.

In the embodiment shown in FIG. 1, Ti represents an input terminal to which a DC input voltage $V_{IN}$ is supplied. C2 represents a capacitor connected between the input terminal T1 and the ground, for smoothing.

Q1 represents a pnp-type switching transistor, whose emitter is connected to the input terminal T1 and whose collector is connected to one end of an inductance coil L. The other end of the coil L is connected to the ground through an output capacitor C3, and also to an output terminal T3.

The base of the switching transistor Q1 is connected through a resistor R2 to the collector of an npn-type drive transistor Q2. The base of the transistor Q2 is connected through a resistor R1 to the input terminal T1. The emitter of the transistor Q2 is connected to the output terminal T3.

Moreover, between the collector of the switching transistor Q1 and the base of the transistor Q2, a capacitor C1 is connected. To the node between the coil L and the collector of the transistor Q1, the cathode of a diode D1 is connected. The anode of the diode D1 is connected to the ground. A Zener diode ZD is provided on the output side (low-voltage side). The Zener diode ZD has its cathode connected to the output terminal T2, and its anode connected to the ground through a resistor R3.

Furthermore, to the node K between the Zener diode ZD and the resistor R3, the base of an npn-type transistor Q3 is connected. The transistor Q3 has its collector connected to the base of the transistor Q2, and its emitter connected to the ground.

Next, the operation of the above embodiment will be described below. Immediately after the input voltage $V_{IN}$ is applied, the output voltage $V_O$ is almost zero volts, and thus the transistor Q3 remains off. Accordingly, the applied voltage $V_{IN}$ causes a current to flow through the resistor R1 into the base of the transistor Q2, thereby turning the transistor Q2 on.

As a result, a current flows from the input terminal T1 through the transistor Q1, from its emitter to its base, thereby turning the transistor Q1 on. The collector current of the transistor Q1 flows through the coil L into the output capacitor C3, thereby raising the output voltage $V_O$. In addition, the emitter current of the transistor Q2 also flows into the output capacitor C3.

While the transistor Q1 is on, a current flows from the collector of the transistor Q1 through the capacitor C1 into the base of the transistor Q2. This current causes the conductivity of the transistor Q2 to be greater, thereby rapidly leading the transistor Q1 into a saturated state. Note that, as the charging of the capacitor C1 progresses, this current decreases.

When the voltage at the output capacitor C3 (output voltage $V_O$) exceeds 5 volts, thereby raising the potential at a node K above the threshold value of the transistor Q3, the transistor Q3 is turned on. This causes the transistor Q2 to be turned off, and subsequently the transistor Q1 is also turned off. Even when the transistor Q1 is turned off, the coil L attempts to keep a current flowing by its electromotive force.

This current is supplied from the ground side as a result of the diode D1 being turned on, and also, though very slightly, from the discharging of the charge with which the capacitor C1 is charged. When a load connected to the output terminal T3 consumes the power to such an extent that the output voltage $V_O$ drops below 5 volts, the transistor Q3 is turned off, thereby turning the transistors Q1 and Q2 on again. In this way, switching operation is repeated to maintain the output voltage $V_O$ nearly constant. In the present invention, since the Zener diode is provided on the output side (i.e. low-voltage side), the power dissipated by the Zener diode ZD is 5 V×5 mA, which is a product of the output voltage 5 V and the Zener current 5 mA. Therefore, as a result of substantial reduction of ineffective current, conversion efficiency is greatly improved, compared with a conventional apparatus.

Figure 2:
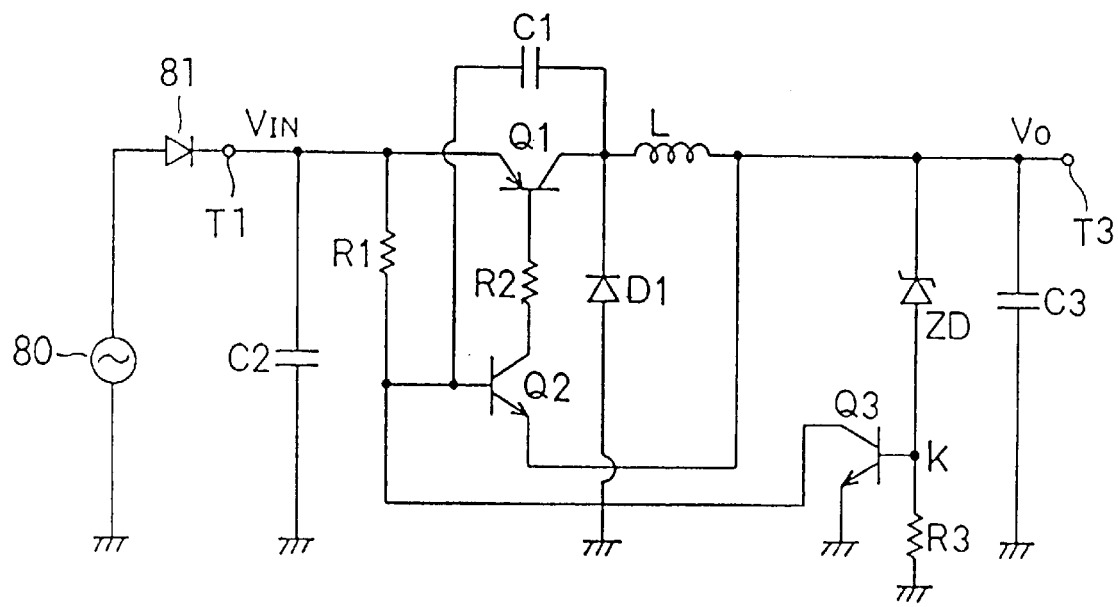
FIG. 2 is a circuit diagram showing the power supply apparatus of a second embodiment of the present invention.

FIG. 2 shows an embodiment which is additionally provided with a construction for obtaining the input voltage $V_{IN}$ by rectifying and smoothing a commercially supplied AC power source 80 with a diode 81 and a capacitor C2. In other respects, this embodiment has the same construction as that shown in FIG. 1. The voltage of the commercially supplied AC power source 80 is, for example, AC 100 V or AC 200 V.

Figure 3:
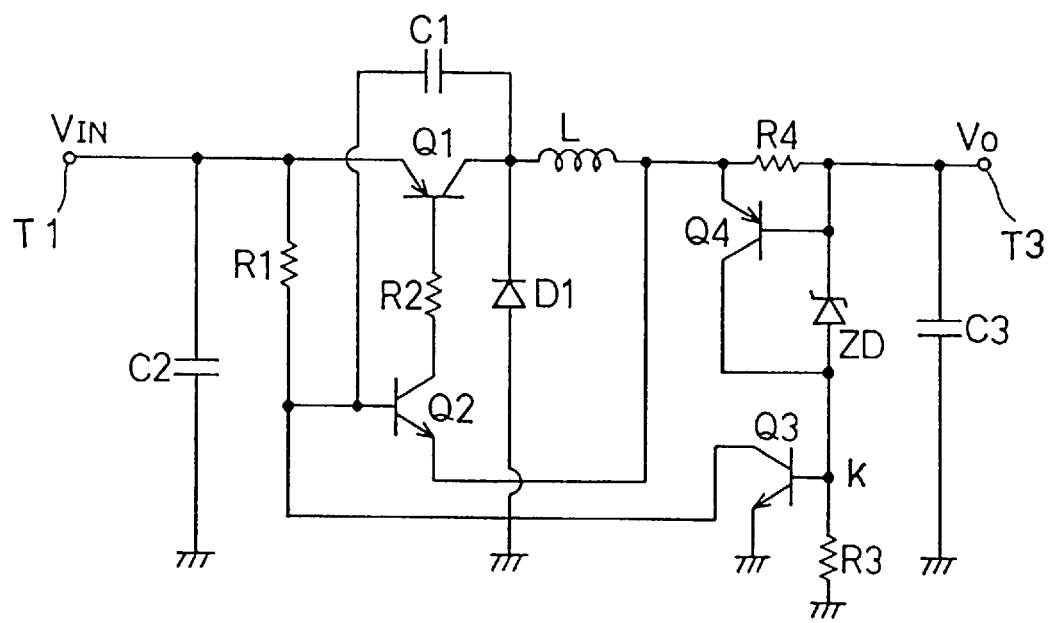
FIG. 3 is a circuit diagram showing the power supply apparatus of a third embodiment of the present invention.

FIG. 3 shows an embodiment in which protection against an overcurrent is provided by connecting, as shown there, a pnp-type transistor Q4, for detecting an overcurrent, and a resistor R4. In FIG. 3, when an overcurrent flows into a load (not shown in the figure) that is connected to the output terminal T3, the voltage across the resistor R4 increases, thereby turning the transistor Q4 on. As a result, the current flowing through the transistor Q4 raises the potential at the node, and accordingly the transistor Q3 is turned on, thereby turning the transistors Q1 and Q2 off. In this way, protection against an over-current is achieved.

Figure 4:
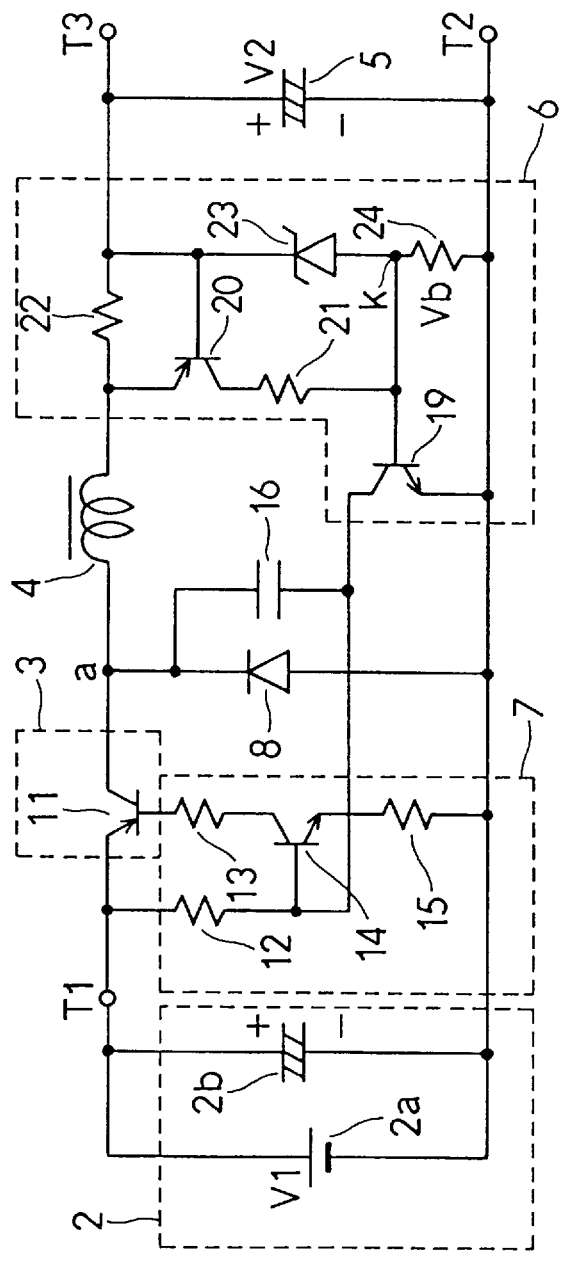
FIG. 4 is a circuit diagram showing the power supply apparatus of a fourth embodiment of the present invention.

The power supply apparatus shown in FIG. 4 is provided with a power supply circuit 2 including a DC power source 2a and an input capacitor 2b, a switching device 3 including a transistor 11, an inductance device 4, an output capacitor 5, a monitoring circuit 6 including resistors 21, 22, and 24, a Zener diode 23, and transistors 19 and 20, a drive circuit 7 including a transistor 14, and resistors 12 to 14, and a diode 8.

The power supply circuit 2 is connected to the emitter of the transistor 11 by way of an input terminal T1. The collector of the transistor 11 is connected to an output terminal T3 through the inductance device 4. The output capacitor 5 is connected between the output terminal T3 and a reference voltage terminal T2. Moreover, the collector of the transistor 19 of the circuit 6 is connected to the base of the transistor 14 of the drive circuit 7, and is also connected to the node a through the capacitor 16. The reference voltage terminal T2 is also connected to the node a through the diode 8.

The operation of the above power supply apparatus will be described below. First, between the output terminal T3 and the reference voltage terminal T2 of the power supply apparatus, a load such as a motor or semiconductor device is connected. When the DC power source 2a is set to a given voltage $V_1$, the circuits of the succeeding stages are supplied with a voltage by way of the input terminal T1, and start operating. The applied voltage causes the transistor 14 to conduct, and this causes the transistor 11 to conduct as well. As a result, a current (hereinafter referred to as "output current") flows through the inductance device 4 into the circuit 6 and the load (not shown in the figure) that is connected between the terminals T2 and T3. Meanwhile, since a current flows into the base of the transistor 14 through the capacitor 16, the collector current of the transistor 14 increases, and thus the transistor 11 becomes saturated rapidly. When the output voltage $V_2$ rises and thus the potential at the node K between the Zener diode 23 and the resistor 24 rises, the transistor 19 is turned on, and the transistors 14 and 11 are turned off. When the transistor 11 is turned off, the coil L develops a back electromotive force, which causes a current to flow through the diode 8 into the coil L and the resistor 22. When the potential at the node K drops below a predetermined value, the transistor 19 is turned off, and the transistors 14 and 11 are turned on. This operation cycle is repeated to maintain the output voltage $V_2$ at a constant voltage. When a large current flows through the load that is connected between the terminals T2 and T3, an accordingly large voltage drop is developed across the resistor 22, and this causes the transistors 20 and 19 to conduct. As a result, since the base voltage of the transistor 14 drops to a low-level voltage, the transistors 14 is cut off, and this causes the transistor 11 to be cut off. At this moment, the inductance device 4 develops a back electromotive force, which keeps the output current flowing into the load and the diode 8.

As the back electromotive force decreases, the output current decreases. When the voltage drop across the resistor 22 decreases so much that the transistor 20 is cut off, the transistor 19 is cut off. This causes the base voltage of the transistor 14 to rise, and accordingly the transistor 11 conducts again. The above operation cycle is repeated to supply the output current to the load.

In the above described embodiment of FIG. 4, as against in the embodiment of FIG. 3, the emitter of the drive transistor 14 is connected to a reference potential node through a resistor 15. In any of the embodiments shown in FIGS. 1 to 3, the emitter current of the drive transistor Q2 flows toward the output side (to the capacitor C3), so that electric power is used accordingly effectively.

Figure 5A:
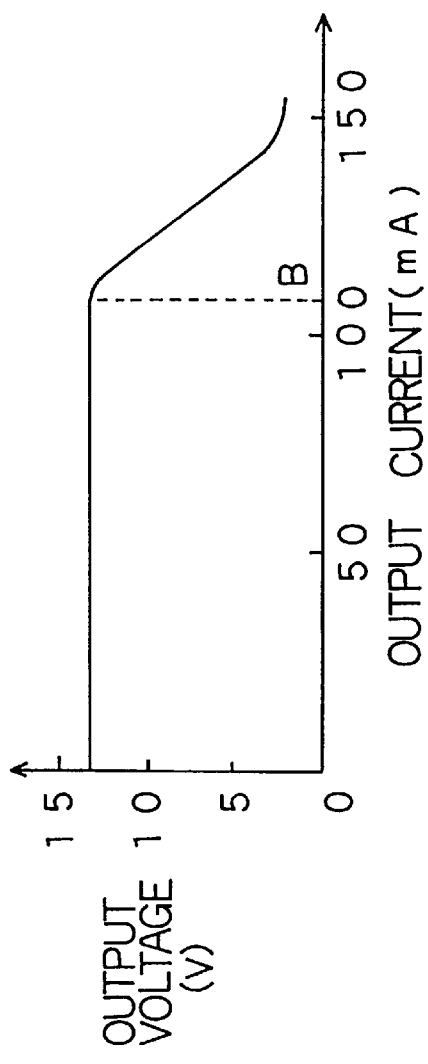
FIG. 5A is a diagram showing the characteristic of the output voltage with respect to the output current in the fourth embodiment.
Figure 5B:
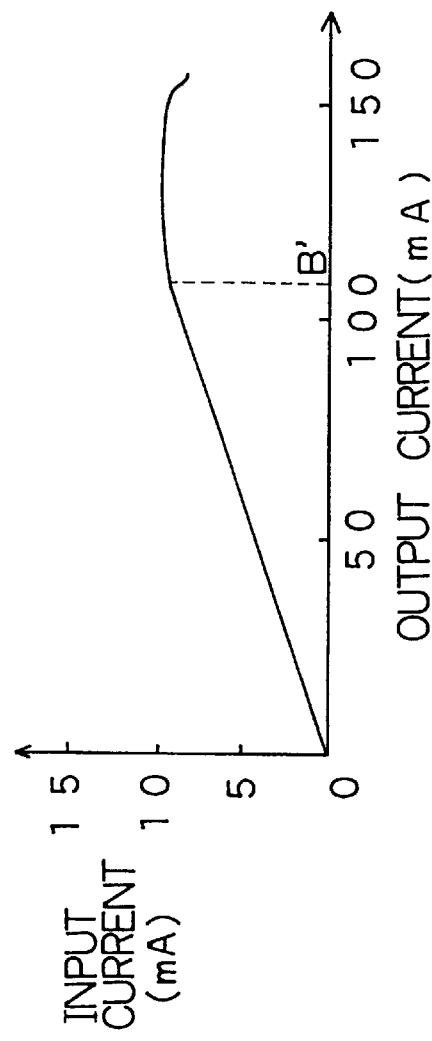
FIG. 5B is a diagram showing the characteristic of the input current with respect to the output current in the fourth embodiment.
Figure 6:
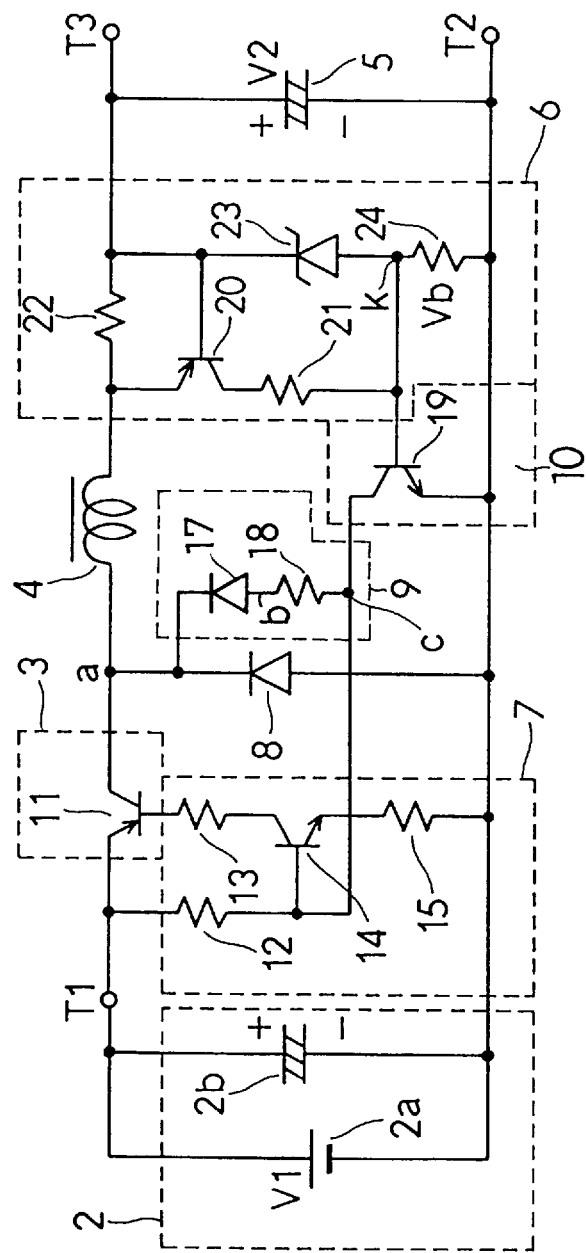
FIG. 6 is a circuit diagram showing the power supply apparatus of a fifth embodiment of the present invention.

The embodiment shown in FIG. 6 is an improved version of the embodiment shown in FIG. 4. For example, in the power supply apparatus of FIG. 4, the output voltage and the input current have characteristics as shown in the waveform diagrams, FIGS. 5A and 5B, respectively, relative to the output current that flows into the load. Specifically, as the output current increases in excess of the rated value (points B and B' in FIGS. 5A and 5B), both the output voltage and the input current drop gradually, and also the period of the above-mentioned operation cycle becomes shorter. As a result, the power dissipation in the circuit elements such as the transistor Q1 and the inductance coil L increases, and thus the power supply unit itself, as well as the individual circuit elements, generates excessive heat. Moreover, as the circuit elements generate more heat, it becomes necessary to provide heat disposal measures for the circuit element packages and the circuit board on which they are mounted. As a result, the sizes of the circuit elements become larger, and thus the size of the power supply unit itself and also the size of the appliance in which the power supply unit is incorporated inevitably become accordingly larger.

By contrast, in the power supply apparatus of FIG. 6, the above problems are overcome by reducing heat generation in the individual circuit elements. The power supply apparatus of FIG. 6 comprises a switching device 3 that conducts or cuts off a power source voltage at predetermined timings (hereinafter referred to as "switching"); an inductance device 4 that develops a back electromotive force when the power source voltage is cut off by the switching device 3; an output capacitor 5 of electrolytic type that is charged by the back electromotive force developed by the inductance device 4 and thus decreases the output impedance; a monitoring circuit 6 that monitors the output current and deactivates the switching device 3 when an abnormal voltage is received; a control circuit 10 that is turned on and off in response to an output from the monitoring circuit 6; a drive circuit 7 that controls and drives the switching device 3 according to a signal from the control circuit 10; a diode 8 that forms a path for a current resulting from the back electromotive force developed in the inductance device 4; and a characteristic improving circuit 9 that adds a "drooping" feature to the characteristic of the output voltage relative to the output current, so that, as the output current increases in excess of a predetermined current value, the output voltage drops steeply.

The constructions of the individual circuit elements will be described in more detail below. The switching device 3 is composed of a pnp-type transistor 11 whose emitter is connected to an input terminal T1 and whose collector is connected to the inductance device 4. The inductance device 4 is composed of a coil that is wound around a core made of ferrite, amorphous material, or other. The monitoring circuit 6 is composed of a resistor 22 with which the output current flowing into the load is monitored, a Zener diode 23 and a resistor 24 that are connected in series between an output terminal T3 and a reference voltage terminal T2, a pnp-type transistor 20 whose base is connected to the output terminal T3, whose emitter is connected between the resistor 22 and the inductance device 4, and whose collector is connected through a resistor 21 to a node between the anode of the Zener diode 23 and the resistor 24. The control circuit 10 is composed of an npn-type transistor 19 whose base is connected to the anode of a Zener diode 23, whose emitter is connected to the reference voltage terminal T2, and whose collector output controls the drive circuit 7. The drive circuit 7 is composed of an npn-type transistor 14 whose collector is connected through a resistor 13 to the base of a transistor 11, whose emitter is connected through a resistor 15 to the reference voltage terminal T2, and whose base is connected through a resistor 12 to the input terminal T1. The characteristic improving circuit 9 is composed of a diode 17 whose cathode is connected to the cathode of the diode 8 and whose anode is connected through a resistor 18 to the collector of the transistor 19.

The interconnection between the individual circuit elements will be further described below. By way of the input terminal T1, a power source voltage is connected to the emitter of the transistor 11. The collector of the transistor 11 is connected through the inductance device 4 to the output terminal T3. Between the output terminal T3 and the reference voltage terminal T2, the output capacitor 5 is connected. Moreover, the collector output of the transistor 19 of the control circuit 10 is connected to the base of the transistor 14 of the drive circuit 7, and also to the node a through the characteristic improving circuit 9. Furthermore, the reference voltage terminal T2 is also connected to the node a through the diode 8. Here, suppose that the reference voltage terminal T2 is connected to a ground-potential node, although this is not prerequisite.

As to the operation of the above described embodiment under a heavy load (when a load that consumes a large amount of current is connected to it), a description will be given below. Note that, under a light load, the transistor 20 remains off, never to be turned on. First, a device serving as a load, such as a motor or semiconductor device, is connected between the output terminal T3 and the reference voltage terminal T2 of the power supply apparatus. Furthermore, a power supply circuit 2 is connected to the voltage input terminal T1. The power supply circuit 2 comprises a DC power source 2a, and an electrolytic capacitor 2b that is connected in parallel with the power source 2a to reduce its impedance. When the DC power source 2a is set to a given voltage $V_1$, the circuits of the following stages are supplied with a voltage by way of the input terminal T1, and start operating. The applied voltage causes the transistor 14 to conduct, and this causes the transistor 11 to conduct as well. As a result, an output current flows through the inductance device 4 into the monitoring circuit 6 and the load. At this moment, the diode 17 is off, and therefore it is equivalent to the capacitor 16 in FIG. 4. As a result, the base of the transistor 14 receives a positive feedback from the collector of the transistor 11, and accordingly the transistor 11 is rapidly saturated.

Figure 8:
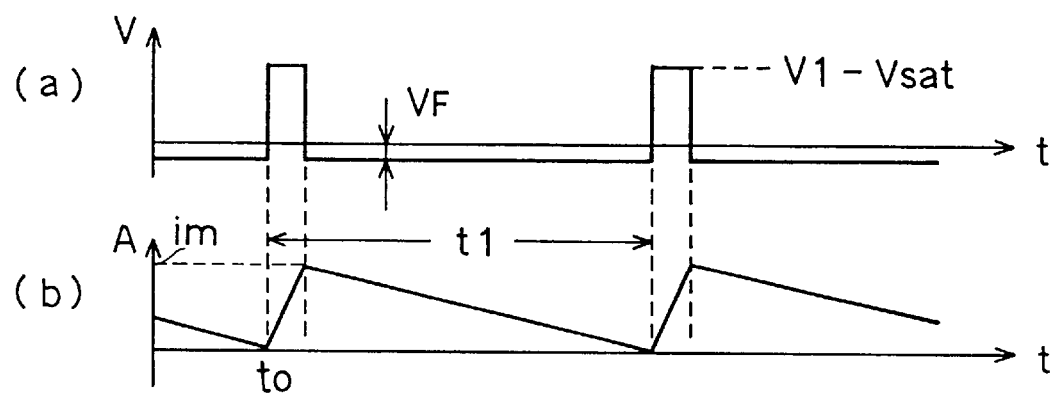
FIG. 8 is a diagram showing waveforms observed during operation of the power supply apparatus of the fifth embodiment.

In FIG. 8, $t_0$ indicates the time when the voltage $V_1$ is applied. When a current flowing through the resistor 22 reaches im shown in FIG. 8, the voltage drop developed across the resistor 22 causes the transistors 20 and 19 to conduct. When the transistor 19 conducts, the base voltage of the transistor 14 drops to a low-level voltage. As a result, the transistor 14 is cut off, causing the transistor 11 to be cut off. At this moment, the inductance device 4 develops a back electromotive force, which keeps the output current flowing into the load and the diode 8. However, since this current decreases from im, the transistors 20 and 19 are cut off ultimately. As a result, the transistors 14 and 11 attempt to conduct, but the characteristic improving circuit 9 prevents, for a while, the transistors 14 and 11 from conducting. This behavior will be described below. When the switching transistor 11 is cut off, thereby causing a back electromotive force to be developed in the inductance device 4, the diode 8, which forms a path for a current resulting from the back electromotive force, is turned on, and also the diode 17 is turned on. Under this condition, point b in FIG. 6 is 0 volt, and the voltage $V_c$ at point c in FIG. 6 is $$V_c = V_1 \times R_{18}/(R_{12}+R_{18}),$$

and this voltage $V_c$ is determined to be lower than the threshold value of the transistor 14 by the resistances of the resistors 12 and 18. The resistor 18, which may be omitted, is provided here to protect the diode 17 from an overcurrent. When the back electromotive force, and thus the output current, further decreases until the output current becomes below the level of current (called "forward current") that is defined by the forward voltage (generally, between 0.4 and 1.7 volts), the forward voltage of the diode 17 also drops accordingly. Then, the base voltage of the transistor 14 rises, causing the transistor 11 to conduct again.

Figure 7A:
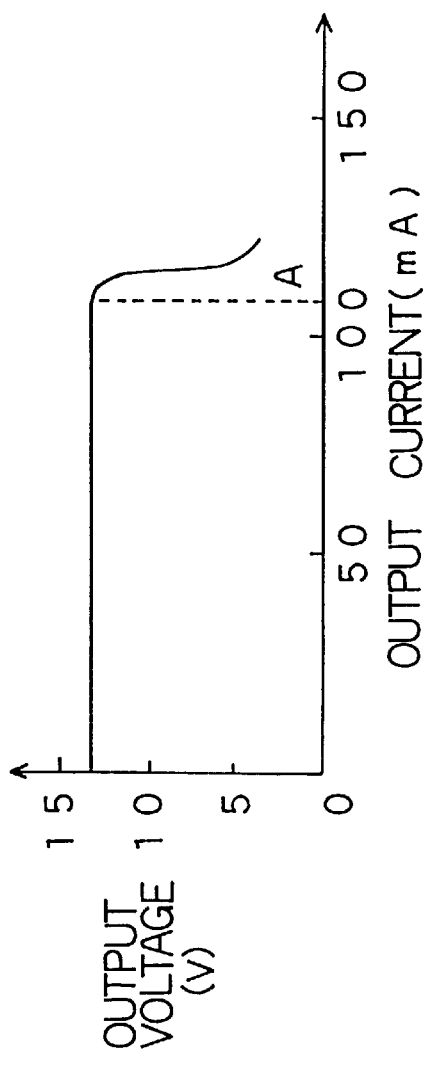
FIG. 7A is a diagram showing the characteristic of the output voltage with respect to the output current in the fifth embodiment.
Figure 7B:
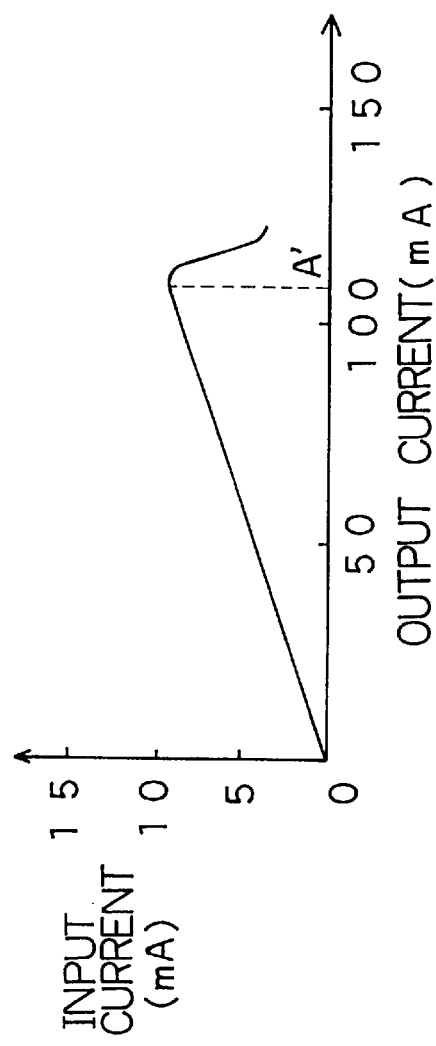
FIG. 7B is a diagram showing the characteristic of the input current with respect to the output current in the fifth embodiment.

As shown in FIG. 7A, while the output current remains below a predetermined value (point A in FIG. 7A), switching is controlled based on the voltage at the node K, and accordingly the output voltage is kept constant. However, when the output current exceeds the predetermined value, the above described operation for a heavy load is performed, and accordingly the output voltage drops rapidly. Thus, the power supply apparatus exhibits a "drooping" output characteristic. On the other hand, its input current characteristic is as shown in FIG. 7B. Owing to these electrical characteristics, it is possible to greatly reduce the power dissipation that arises when the output terminal T3 is short-circuited to the reference voltage level or when an overload is connected to the output. This means that it is possible to accordingly reduce heat generated by the circuit, and thus to make the circuit and the power supply apparatus more compact as a whole. For example, the circuit of the present invention can reduce power dissipation by 40 percent, compared with a conventional circuit.

FIG. 8 shows examples of the waveforms of the voltage at the node a and the current flowing through the inductance device 4 of the power supply apparatus shown in FIG. 6. Note that, in FIG. 8, ripple voltage components and the like are omitted. In (a) of FIG. 8, $V_{sat}$ represents the saturation voltage of the transistor 11 when it is conducting, and t1 represents the periodic time of the operation cycle of the switching device 3. In (b) of FIG. 8, the current flowing through the inductance device 4 is defined as follows. Suppose that the voltage across the capacitor 2b is $V_1$ (V), the output voltage across the capacitor 5 is $V_2$ (V), the voltage across the resistor 22 is $V_{bc}$(V), the inductance of the inductance device 4 is L (H), the forward voltage developed across the diode 8 by the back electromotive force is $V_F$ (V), and the time lapse is $\Delta t$ (s). Then, the charge current from the transistor 11, when it is conducting, is defined by the formula (1) below, whereas the charge current resulting from the back electromotive force developed while the transistor 11 is cut off is defined by the formula (2) below.

$$i=(V_1-(V_2+V_{be}))\times\Delta t/L \quad (1)$$

$$i'=-(V_2-(V_F-V_{be}))\times\Delta t/L \quad (2)$$

Note that the values of the constants, such as the output current, are set according to the actually connected load so that the required amount of current can be obtained. For example, if the required peak value of the output current is 100 mA, the periodic time t1 of the operation cycle is set to be of the order of microseconds to tens of microseconds, the inductance of the inductance device 4 is set to be of the order of millihenries to tens of millihenries, and the resistance of the resistor 22 is set to be of the order of ohms to tens of ohms.

Figure 9:
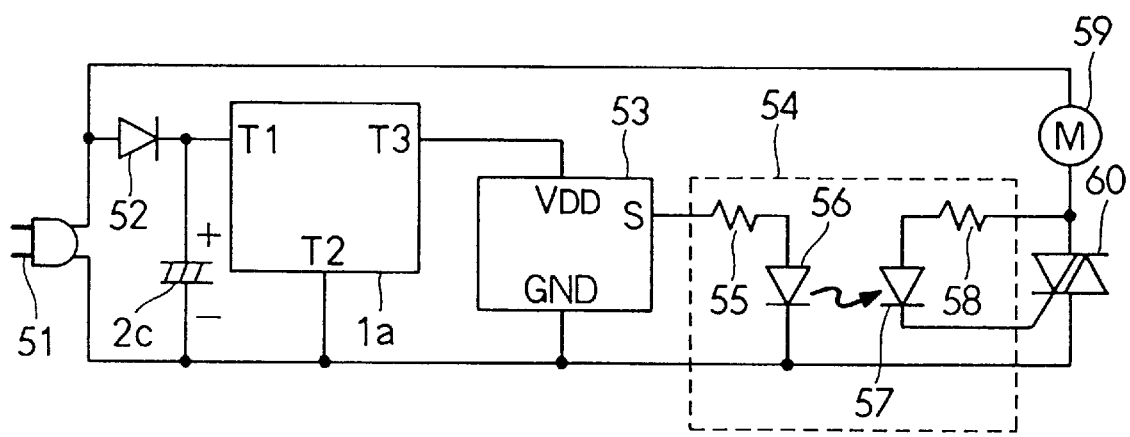
FIG. 9 is a diagram showing how the power supply apparatus of the present invention is applied.

FIG. 9 shows another embodiment in which the power supply apparatus of FIG. 6 is applied as an application circuit in an electric appliance such as an electric vacuum cleaner. The application circuit of FIG. 9 comprises a plug 51 for receiving an AC voltage (from a so-called commercial electric power supply); a power supply circuit, consisting of a diode device 52 and an input capacitor 2c, for rectifying and smoothing the AC power source to obtain a power source voltage for the power supply apparatus of the present invention; a semiconductor device 53 such as a one-chip microcomputer that is operated with the power source voltage supplied from the power supply apparatus; an interrupter circuit 54 for transferring a control signal from the semiconductor device 53; a drive device 60 such as a triac that controls the AC power source so that it is conducted or cut off according to the control signal supplied from the interrupter circuit 54; and a load such as a motor that is operated with the AC power source controlled by the drive device 60.

The interconnection between the individual circuit elements will be described below. By way of the plug 51, one end of the AC power source is connected to the reference voltage terminal T2 of the power supply apparatus and to the reference-voltage sides (GND) of the individual circuits, and the other end is connected to the load 59 and to the anode of the diode device 52. The power source voltage, obtained as a result of rectification and smoothing by the diode device 52 and the input capacitor 2c, is connected to the voltage input terminal T1 of the power supply apparatus of the present invention. The output terminal T3 of the power supply apparatus is connected to the power source voltage terminal ($V_{DD}$) of the semiconductor device 53. The output S of the semiconductor device 53 is connected through a resistor 55 to the anode of a light-emitting diode 56 of the interrupter circuit 54. The light emitted by the lightemitting diode 56 is received by a photoreceptor 57 such as a p-i-n diode connected through a resistor 58 between one anode and the gate of the triac of the drive device 60. The other anode of the triac is connected to the load 59. Owing to such a circuit construction, it is possible to control a load such as a motor that uses an AC power source.

Note that application of the present invention is not limited to embodiments such that are described above. For example, it is also possible to use in the power supply circuit a full-wave rectification circuit with a diode bridge circuit and a center-tapped transformer, to provide the power supply circuit with a switch circuit for controlling the operation, to provide a display device such as a light-emitting diode for indicating the operation status, or to divide the output voltage of the power supply apparatus of the present invention by use of resistors or other before supplying it as the power source voltage for the one-chip microcomputer or other. Moreover, the voltage monitoring portion of the monitoring circuit can be constructed in any way, as long as it can monitor the current flowing through the load. Furthermore, the circuit of the present invention can be formed with only discrete electronic components, or alternatively it can be formed into a single chip of semiconductor device in which all such circuit portions that consist solely of transistors, diodes, and resistors are integrated. Moreover, instead of bipolar transistors used in the circuits shown in the figures, it is also possible to use MOS transistors to construct the circuit.

As described above, according to the embodiment of FIG. 6, it is possible to reduce internal power dissipation in a power supply apparatus with a simple circuit construction. Accordingly, it is possible to form a power supply apparatus with compact and inexpensive electronic components, or with a single compact semiconductor device in which such electronic components are integrated, and thus to form a compact and inexpensive power supply apparatus.

What is claimed is:

1. A power supply apparatus comprising:
   an input terminal;
   an output terminal;
   a switching means and an inductance means that are connected in series between the input terminal and the output terminal;
   a monitoring circuit connected between the output terminal and a reference potential node, for monitoring a voltage at the output terminal;
   a drive circuit for putting the switching means into either a conducting state or a nonconducting state according to a monitoring result of the monitoring circuit; and
   a path means for forming a path for a current resulting from a back electromotive force that is developed in the inductance means when the switching means is put into a non-conducting state, said path means including a capacitor connected between an output of said switching means and an input of said drive circuit.

2. A power supply apparatus as claimed in claim 1, wherein said monitoring circuit comprises a Zener diode and a first resistor that are connected in series, and monitors a voltage of the output terminal by monitoring a voltage across the first resistor.

3. A power supply apparatus as claimed in claim 2, wherein said drive circuit includes a transistor that puts the switching means into a non-conducting state when a voltage across the first resistor exceeds a predetermined voltage.

4. A power supply apparatus as claimed in claim 2, further comprising:
   a second resistor provided between the inductance means and the output terminal, for detecting an overcurrent; and
   a transistor that is activated when a voltage across the second resistor exceeds a predetermined value in order to supply a current to the first resistor.

5. A switching power supply circuit in which on/off operation of a switching transistor allows a current on an input side of the switching transistor to flow into a first capacitor connected on an output side of the switching transistor in order to charge the first capacitor and in which an output from the first capacitor is supplied as a power source to a load, comprising:
   means for connecting a base of said switching transistor to said output side through a drive transistor;
   means for connecting a base of said drive transistor to said input side;
   a second capacitor connected between an output of said switching transistor and a base of said drive transistor;
   detection means for detecting whether or not a voltage on said output side is above a predetermined value; and
   control means for controlling said drive transistor to be turned on and off according to an output from the detection means, therein to control the switching transistor to be turned on and off.

6. A switching power supply apparatus comprising:
   a pnp-type first transistor whose emitter is connected to an input terminal;
   a coil and a first capacitor that are serially connected therebetween a collector of the first transistor and ground;
   an output terminal for extracting an output from a node between said coil and said first capacitor;
   an npn-type second transistor whose collector is connected to a base of the first transistor, whose base is connected to said input terminal, and whose emitter is connected to said output terminal;
   a second capacitor connected between the collector of the first transistor and the base of the second transistor;
   a constant voltage generating means and a first resistor that are serially connected between said output terminal and ground; and
   a control means which is connected, at its one end, to a base of the second transistor and which turns the second transistor off when a voltage at a node between said constant voltage generating means and said first resistor exceeds a predetermined voltage.

7. A switching power supply apparatus as claimed in claim 6,
   wherein said control means is an npn-type third transistor whose collector is connected to a base of the second transistor, whose emitter is connected to a ground, and whose base is connected to a node between said constant voltage generating means and said first resistor.

8. A switching power supply apparatus as claimed in claim 6,
   wherein said constant voltage generating means is a Zener diode.

9. A switching power supply apparatus as claimed in claim 6, further comprising:
   a second resistor provided between an output electrode of the switching transistor and the output terminal, for detecting an overcurrent; and
   a transistor that is activated when a voltage across the second resistor exceeds a predetermined value in order to supply a current to a first resistor.

10. A power supply apparatus comprising:
    an input terminal to which a voltage is applied;
    an output terminal for outputting a voltage;
    a switching means and an inductance means that are connected in series between the input terminal and the output terminal;
    a monitoring means for monitoring a current flowing at the output terminal;
    a drive circuit for putting the switching means into either a conducting state or a non-conducting state according to a monitoring result of the monitoring means;
    a first diode for forming a path for a current resulting from a back electromotive force that is developed in the inductance means when the switching means is put into a non-conducting state; and
    a cut-off means, connected between an output of said drive circuit and said path, for keeping said switching means in a cut-off state until the back electromotive force developed in said inductance means becomes too small to maintain a forward voltage of said first diode.

11. A power supply apparatus as claimed in claim 10, wherein said cut-off means comprises a second diode that is connected, at one end, to the first diode and, at other end, to the drive circuit.

12. A power supply apparatus comprising:
    an input terminal for receiving a DC voltage;
    an output terminal for outputting a DC voltage;
    a pnp-type switching transistor whose emitter is connected to the input terminal;
    an inductance coil that is connected, at its one end, to the collector of the switching transistor and, at its other end, to the output terminal;
    a capacitor that is connected between the output terminal and a reference voltage node;

a drive transistor which is connected between a base of the switching transistor and the reference potential node and whose base is connected to the input terminal;

a monitoring circuit for monitoring a current flowing at the output terminal;

a control means for controlling the drive transistor to put the switching transistor into either a conducting state or a non-conducting state according to a monitoring result of the monitoring circuit;

a first diode whose cathode is connected to the inductance coil and whose anode is connected to the reference potential node to form a path for a current resulting from a back electromotive force that is developed in the inductance coil when the switching transistor is put into a non-conducting state; and a second diode whose cathode is connected to a cathode of the first diode and whose anode is connected to a base of the drive transistor.

13. A power supply apparatus comprising:

an input terminal for receiving a DC voltage;

an output terminal for outputting a DC voltage;

a pnp-type switching transistor whose emitter is connected to the input terminal;

an inductance coil that is connected, at its one end, to the collector of the switching transistor and, at its other end, to the output terminal;

a capacitor that is connected between the output terminal and a reference potential node;

a drive transistor which is connected between a base of the switching transistor and the reference potential node and whose base is connected to the input terminal;

a monitoring circuit for monitoring a current flowing at the output terminal;

a control transistor which is connected between a base of the drive transistor and the potential voltage node and which is made to conduct by an output from the monitoring circuit when an amount of a current flowing at the output terminal is above a predetermined amount in order to control the drive transistor to put the switching transistor into a non-conducting state;

a first diode whose cathode is connected to the inductance coil and whose anode is connected to the reference potential node to form a path for a current resulting from a back electromotive force that is developed in the inductance coil when the switching transistor is put into a non-conducting state; and a second diode whose cathode is connected to a cathode of the first diode and whose anode is connected to a base of the drive transistor.

14. A power supply apparatus as claimed in claim 13, wherein said second diode has its anode connected to a base of the drive transistor through a resistor.

15. A power supply apparatus as claimed in claim 13, wherein said monitoring circuit includes a resistor that is connected between the inductance coil and the output terminal, and a transistor that is activated when a voltage across that resistor exceeds a predetermined value in order to make said control transistor conduct.

16. A power supply apparatus as claimed in claim 13, wherein said monitoring circuit includes a detection means for detecting a voltage at the output terminal, and the control transistor is made to conduct when the voltage exceeds a predetermined value.

17. A power supply apparatus as claimed in claim 16, wherein said detection means comprises a Zener diode and a resistor that are connected in series between the output terminal and a reference potential node, and a node between the Zener diode and the resister is connected to the control transistor.

* * * * *